3,296,211
HYDROXY-TERMINATED POLYESTERS
Joseph Winkler, Sacramento, and Eugene A. Bratoeff, Rancho Cordova, Calif., assignors to Aerojet-General Corporation, Azusa, Calif., a corporation of Ohio
No Drawing. Filed Nov. 1, 1961, Ser. No. 151,139
16 Claims. (Cl. 260—75)

This invention relates to new compounds and their method of preparation. More particularly, this invention relates to new hydroxy-terminated polyesters and a process for their production.

Hydroxy-terminated polyesters are, in general, well known. However, they have serious disadvantages. In particular, great difficulty has been encountered in regulating their curing time which sometimes occurs too rapidly. This creates problems because it is desirable in curing a polymer to have a considerable delay between addition of the curing agent and the time when the reaction mass becomes too viscous to cast. This delay permits flexibility in equipment and process set up and allows time for mixing other ingredients into the uncured mass. Further difficulty has been experienced because these polyesters are easily hydrolized by water. Also, the viscosity of these polyesters is too high for some purposes.

The preparation of hydroxy-terminated polyesters using secondary diols is known. These polyesters have a slow curing rate. Any advantages gained from their slow curing rate—for example, with a polyisocyanate—are more than offset, however, by the slow rate of formation of the polyesters themselves.

Hydroxy-terminated polyesters which have been cured by mixing with a diisocyanate and also various cross-linking agents deteriorate rapidly upon exposure to extreme conditions of temperature, sunlight, and humidity. This deterioration, believed due to the low thermal stability of the hydroxy terminated polyester, makes these materials unsuitable for many uses such as in outdoor decorations, signs, displays, solid propellants, etc.

An object of this invention is the provision of new and useful hydroxy-terminated polyesters having valuable properties including a long curing time, a rapid rate of formation, a resistance to hydrolysis, a low viscosity, and an improved thermal stability in the cured state. A further object is the provision of a novel process for manufacturing these hydroxy-terminated polyesters. Other objects will appear hereinafter.

The above objects are accomplished by providing a hydroxy-terminated polyester having the formula:

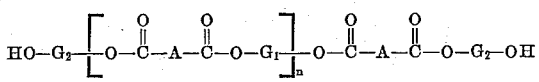

In the broadest aspect of this invention $n$ is an integer ranging from about 2 to about 50, and A is an aliphatic or cycloaliphatic divalent alkylene or cycloalkylene radical which can be saturated or unsaturated and contains from 0 to about 34 carbon atoms. $G_1$ and $G_2$ are divalent aliphatic or oxyaliphatic radicals which can be saturated or unsaturated. When oxyaliphatic, the aliphatic radicals present in the oxyaliphatic radicals may be repeating as in polyoxyalkylene compounds. The aliphatic radicals present in $G_1$ and $G_2$ can contain from about 2 to about 10 carbon atoms. The open valences of the radical $G_1$ are on primary carbon atoms and at least one of the open valences on the radical $G_2$ (at the point of bonding to the terminal hydroxy group) must be attached to a secondary carbon atom. A polyester having this structure possesses a rapid rate of formation, a long curing time, and a high resistance to water hydrolysis.

In a preferred form of our polyesters, $n$ is an integer ranging from about 2 to about 50; A is an aliphatic divalent radical, saturated or unsaturated, containing from 0 to about 10 carbon atoms; $G_1$ and $G_2$ are aliphatic or oxyaliphatic radicals, and at least one of the radicals, A, $G_1$, or $G_2$ contains branching side chains. Further, A, $G_1$, or $G_2$ can be saturated or unsaturated. The oxyaliphatic radicals which can be present as $G_1$ or $G_2$ may be a repeating one such as found in polyoxyalkylene compounds. The aliphatic radical present in $G_1$ or $G_2$ can contain from 3 to about 10 carbon atoms. The open valence bonds on the radical $G_1$ are only on primary carbon atoms and the radical $G_2$ contains at least one open valence on a secondary carbon atom, which is bonded to the terminal hydroxy group. Our polyesters having this composition can be formed rapidly, possess a long curing time, a high resistance to hydrolysis, and in addition have a relatively low viscosity. Their low viscosity makes them suitable for many uses, such as use in a solid propellant binder, where they are admixed with large quantities of filler materials.

In our most preferred polyesters, $n$ is an integer ranging from about 2 to about 50, A is an alkylene radical having from 0 to about 10 carbon atoms; $G_2$ is an alkylene radical having from 3 to about 10 carbon atoms and is bonded to the terminal hydroxy radical through a secondary carbon atom; $G_1$ is an alkylene radical having from 5 to about 10 carbon atoms in a straight chain and having two alkyl side chains connected to the carbon atoms or atoms which are one carbon atom removed from the open alkylene bonds.

The hydroxy-terminated polyesters of this invention can be cured to a solid state, e.g., by reacting them with diisocyanates, polyisocyanates, diisothiocyanates, or polyisothiocyanates or mixtures of one or more of these with or without a polyol.

The presence of a small amount of unsaturation in our polyesters is often desirable because it permits cross-linking of the polyester with itself, as, for example, in the presence of a catalyst such as dicumyl peroxide, benzoyl peroxide, tertiarybutyl peroxide, sulfur, or tertiarybutyl hydroperoxide.

The branching of our preferred $G_1$ radical is believed responsible, at least in part, for the superior thermal stability of our preferred polyesters after they have been cured. In the instance where the alkylene straight chain is three carbon atoms in length the branching is only on the central carbon atom. In this instance both secondary hydrogens on the central carbon atom are replaced by alkyl side chains. Where the straight chain of the alkylene radical contains more than three carbon atoms, alkyl side chains must be attached to more than one carbon atom in the chain. If, for example, the alkylene straight chain is 1,5-pentylene, there will be at least two side chains on the number 2 carbon atom and two side chains on the number 4 carbon atom.

Typical $G_1$ radicals include ethylene, butylene, butenylene, 3-oxy-1,5-pentylene, pentenylene, 4,8-dioxy-1, 11-undecylene and divalent radicals derived from polytetramethylene glycol and polyethylene glycol.

Preferred $G_1$ alkylene radicals are 2,2,4,4-tetramethyl-1, 5-pentylene, 2,2,3,3,-tetramethyl-1,4-butylene, 2,2,5,5-tetramethyl-1,6-hexylene, 2,2,7,7-tetramethyl-1,8-octylene, 2, 2-dimethyl-1,3-propylene, 2,2-diethyl-1,3-propylene and the like. The presence of these radicals produces a high quality polyester having superior thermal stability in the cured state.

Typical A radicals include butadieneylene, methylene, 1,3-propylene, 1,2-propylene, tetradecylene, ethenylene, 1-ethyl-1-butyl-propylene-1,3 and the divalent radical derived from the decarboxylation of dilinoleic acid.

The preferred alkylene radical A, as stated above, can contain from 0 to about 10 carbon atoms. Preferably, A contains an odd number of carbon atoms. Such radicals are preferred because our polyesters in which A contains an odd number of carbon atoms generally have a lower viscosity than our comparable polyesters where A contains an even number of carbon atoms.

More preferably, A contains from 5 to 9 carbon atoms. An alkylene radical of this class will give good balance of viscosity in our polyester and high tensile strength in the cured product (our polyester plus a diisocyanate, polyisocyanate, polyisothiocyanate or diisothiocyanate as defined above). Alkylene radicals, A, which have more than 9 carbon atoms are less desirable from the standpoint of viscosity of the polyester, while those having less than 5 carbon atoms will produce a less desirable strength in the cured product. Low viscosity is desirable where it is desired to load the liquid hydroxyl terminated polyester with solids, such as pigments or fillers. Low viscosity improves mixing and casting and reduces the number of voids due to entrapped air.

Our most preferred A radicals are those having 5, 7, or 9 carbon atoms in a straight chain. These radicals provide strength in the cured product in combination with a relatively low viscosity in the uncured polyester.

The most preferred alkylene radical $G_2$ contains from about 3 to about 7 carbon atoms and has at least one alkylene bond attached to a secondary carbon atom. A terminal hydroxy radical is attached to the open alkylene bond on the secondary carbon atom.

Typical $G_2$ radicals include 1,2,2,3,4,4-hexamethyl-1,3-cyclobutylene; 3-oxy-2,5-dimethyl-pentylene-1,5; and 4-oxy-3,7-dimethylheptylene-1,7.

Preferred $G_2$ alkylene radicals are 2,2,4-trimethyl-1,3-pentylene; 1,3-butylene; 1,2-propylene; 1,4-pentylene; 2-methyl-1,3-butylene; 3,3-dimethyl-1,4-pentylene; 2,2-dimethyl-1,3-butylene; 2,4-dimethyl-1,3-pentylene; 2,4-pentylene; 3-methyl-2,4-pentylene and 2,3-butylene. Our $G_2$ radicals, as illustrated above, provide slow curing rates which provide sufficient time for mixing and casting the final polymer.

The general reaction scheme for the preparation of our new polyester is as follows:

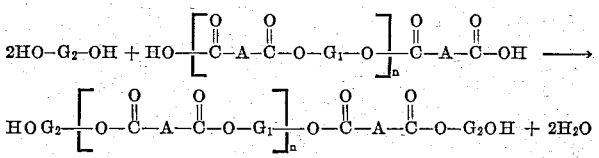

In the above equation, $n$, $a$, $G_1$, and $G_2$ have the same meaning as set forth previously.

Various catalysts can be used in the preparation of our new polyester such as Lewis acid catalysts including aluminum trichloride, stannic chloride, titanium tetrachloride, boron trifluoride, butyl tindilaurate, phosphoryl chloride, phosphorous trichloride, phosphorous pentachloride, and various ion exchange resins.

Various solvents can be used in the polymerization reaction. Solvents which can be added to the polymerization mass include aromatic solvents such as xylene, toluene, or benzene. These solvents will form an azeotropic mixture with the water formed in the reaction which can be removed by distillation under vacuum.

The acid terminated polyesters employed as a reactant in our process can be prepared according to the general procedure which involves heating a diol, HO—$G_1$—OH, with an excess of dicarboxylic acid,

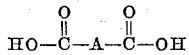

in the absence of oxygen until the evolution of water ceases.

The hydroxy-terminated polyesters of this invention can be prepared by heating a diol HO—$G_2$—OH, with an acid terminated polyester,

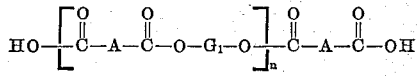

to an elevated temperature and under an inert atmosphere or vacuum. The inert atmosphere can be composed of any inert gas such as nitrogen or carbon dioxide. The inert atmosphere can be under pressure if desired. Pressures below atmospheric can be used, however, to facilitate the removal of water formed in the reaction.

The reactants are continuously stirred together and heated (generally 0.5 to 2 hours) to a temperature in the range of about 150° C. to about 250° C. The specific temperature selected is dependent upon the specific polyester being formed. The reaction is generally held at this temperature until the water formed by the reaction is substantially driven off. The temperature is then raised to a temperature between about 175° C. and about 275° C. to complete the condensation reaction and remove any additional water which is formed.

The above condensation reaction can be carried out completely at one temperature, as described, or in a plurality of steps at different temperatures. The temperature can be changed either rapidly or slowly from one step to another. Selection of a particular procedure is dependent upon the particular reactants employed. Thus, where a highly volatile diol is used as the reactant

it is desirable to elevate the temperature as rapidly as possible (generally 5 to 15 minutes) to avoid loss of diol before it has an opportunity to react.

An excess of the diol is employed to insure that all of the acid terminated polyester will react. The amount of excess diol should be kept as low as possible to avoid the presence of a large amount of unreacted diol in the product.

Other processes of polymerization can be used for the preparation of our polyesters. One process which can be used is that of trans esterification. In trans esterification the methyl ester of the acid terminated polyester, defined above, is first prepared. The methyl ester is then reacted at elevated temperatures with the diol HO—$G_2$—OH. A hydroxy-terminated polyester containing the $G_2$ radical as the terminal unit on the polymer chain is thus produced. A side product of this reaction is methanol which is very volatile and can be readily removed from the reaction mass. The temperatures and pressures employed for this reaction are generally of the same order as those described above for reaction of the acid terminated polyester with the polyol.

Another polymerization process which can be used to prepare our polyester involves using as a reactant an acyl halide derivative of the acid terminated polyester defined above. The acyl halide is reacted with a diol,

in a warm basic environment. Bases such as pyridine, ammonium hydroxide, sodium carbonate, morpholene, etc. can be used. Various inert solvents such as water, benzene, xylene, ether, toluene, can be used as the reaction medium. An inert gas can be used, if desired, as a sweep to remove the hydrohalide acid which is formed as a by-product of the reaction. Unlike our other processes involving reaction of an acid terminated polyester or its methylester with a diol, this process requires only mild warming of the reaction mixture in order to drive the reaction.

The course of the polymerization reaction, according to any of the above described processes, can be followed by viscosity measurements or by periodic testing to determine the decreasing acid number. In this way, the reaction can be terminated at any predetermined viscosity or acid number, depending on the degree of polymerization desired.

Preferred polyesters of our invention have a viscosity at 77° F. which is below about 8000 centipoises (cps.) and more preferably below about 5000 cps., an acid number below about 1.5 (preferably below about 1), a moisture content preferably below about 0.05% by weight and an average molecular weight between about 1000 and about 5000, more preferably about 2000. A low acid number and moisture content are desirable where our polyesters are condensed with isocyanate compounds and avoids the splitting out of undesirable reaction products. The low viscosity is desirable in facilitating mixing, handling and casting of the polyester. To illustrate; certain of our polyesters which have a low viscosity can contain up to 90% by weight of solids. This represents a radical improvement over prior art polyester materials. Higher molecular weight is desirable where it is desired to obtain a low heat of exotherm and low shrinkage during cure.

It will be understood by those skilled in the art that the above values represent averages. Thus, a batch of polyester may contain a small percentage of a polyester which has values outside those listed above. However, the average properties of the whole batch will preferably be within the above values.

Mixtures of our polyesters can be employed to achieve a specific desired purpose. For example, it is often found desirable to mix specific polyesters, as defined above, in order to achieve a desired viscosity. Such mixtures can be obtained directly from our process by reaction of mixed acid terminated polyesters and glycols.

Various agents can be added to our liquid polyesters. Such agents included plasticizers and wetting agents. Typical plasticizers which can be used with the polyesters of our invention include dioctyl azelate, dibutylphthalate, tricresyl phosphate, bis-2,2-dinitropropyl acetal, trinitrato pentaerythritol, nitroglycerol dioctyl phenyl phosphate, isodecyl pelargonate, dioctyl adipate, trimethylol trinitrate, etc., and mixtures of these plasticizers. Any inert wetting agent or mixture of wetting agents can be used in conjunction with our polyesters. Typical wetting agents include lecithin, polyglycerol esters of fatty acids, etc.

To further illustrate our invention there are presented the following examples in which all parts and percentages are by weight unless otherwise indicated.

*Example I*

Six moles of azelaic acid are mixed with five moles of neopentylglycol (2,2-dimethyl-1,3-propenediol) in a reaction vessel equipped with a mechanical stirrer, a heating element and a source of nitrogen gas. Dibutyltin oxide catalyst is added and the mixture is stirred continuously under a nitrogen atmosphere while the temperature is raised from room temperature to about 220° C. After the evolution of water substantially ceases, a vacuum is applied to remove the water from the reaction mass. Two moles of 2,2,4-trimethyl-1,3-pentanediol are added and the procedure is repeated. The hydroxy terminated diol obtained has a molecular weight of approximately 1900 and a viscosity of 5000 to 8000 cps. and possesses high thermal and hydrolytic stability.

When Example I is repeated using glutaric, adipic, suberic, or sebacic acid in place of the azelaic acid, similar polyester products are obtained.

*Example II*

Eight moles of oxalic acid are reacted with seven moles of diethylene glycol in a reaction vessel equipped with a mechanical stirrer, a heating element, and a source of nitrogen gas. The mixture is continually stirred after the introduction of p-toluene sulfonic acid catalyst. The temperature of the reaction mass is raised from room temperature to about 200° C. After the evolution of water substantially ceases, a vacuum is applied to remove water. Two moles of polypropylene glycol having a molecular weight of about 1000 are mixed with the reaction mixture and the procedure is repeated. The resulting polyester has a molecular weight of approximately 3200 and a viscosity of about 2500 to 4500 cps. The polyester is found to have high hydrolytic stability.

*Example III*

Three moles of the dimethylester of 1,12-dodecanedioic acid are mixed with two moles of butene diol in a reaction vessel equipped with a mechanical stirrer, a heating element, and a vacuum line. Lead dioxide catalyst is added and the mixture is continuously stirred under vacuum while the temperature is raised from room temperature to about 170° C. After the evolution of methanol substantially ceases, two moles of hexamethylcyclo butane diol are added and the procedure is repeated. The procedure is the same except that water is evolved rather than methanol. The resulting polyester has a viscosity of about 7,000 to 12,000 cps. and a molecular weight of about 1100. This polyester possesses high thermal and hydrolytic stability and can be cured by either cross-linking with itself (through the unsaturated bonds in the polyester), or by reaction with isocyanate compounds.

*Example IV*

Four moles of adipoyl chloride are mixed in a reaction vessel with three moles of hexamethylene glycol and xylene solvent to form a solution. Pyridine catalyst is then added and the mixture is continuously stirred under a nitrogen atmosphere while the temperature is raised from room temperature to about 150° C. Two moles of 2,2-dimethyl-1,3-butanediol are then added to the reaction mixture and heating is continued until water evolution ceases. The reaction mass is then heated under vacuum to remove xylene solvent and the residue is washed with water to remove pyridinyl hydrochloride. The remaining polyester product is heated in vacuo to remove water. The polyester product possesses high thermal and hydrolytic stability.

When the above example is repeated employing glutaroyl bromide, pimeloyliodide, or succinoyl chloride in place of adipoyl chloride, corresponding polyester products are obtained having high thermal and hydrolytic stability.

*Example V*

Five moles of sebacic acid are mixed with four moles of triethylene glycol in a reaction vessel equipped with a mechanical stirrer, a heating element and a source of nitrogen gas. Aluminum trichloride catalyst is added and the mixture is stirred continuously under a nitrogen atmosphere while the temperature is raised from room temperature to about 220° C. After the evolution of water has substantially ceased, a vacuum is applied to remove the water from the reaction mass. Two moles of tripropylene glycol are then added and the above procedure is repeated. The hydroxy terminated diol product has an approximate molecular weight of 1500 coupled with high hydrolytic stability.

Seven moles of maleic acid are mixed with six moles of octamethylene glycol in a reaction vessel equipped with a mechanical stirrer, a heating element, and a source of nitrogen gas. Phosphoryl chloride catalyst is added and the mixture is stirred continuously under a nitrogen atmosphere while the temperature is raised from room temperature to about 220° C. After the evolution of water substantially ceases, a vacuum is applied to remove the water from the reaction mass. Two moles of 2,4-pentanediol are then added and the above procedure is repeated. The hydroxy terminated diol product has a molecular weight of about 2000 and possesses high thermal and hydrolytic stability.

When Example V is repeated in substantially the same manner, as described above, using fourteen moles of maleic acid, twelve moles of octamethylene glycol and two moles of 2,4-pentanediol, the resulting polyester product has a molecular weight of approximately 4000.

The new polyesters of our invention find valuable application when used as a component in a binder for solid propellants. Such propellants act as the primary propulsion source for rocket vehicles. Solid propellants, using our preferred polyesters, can be stored for long periods of time without danger of deterioration. This permits storage even in very hot climates. Thus, a large number of rockets can be stored in strategic locations without the expense of constantly replacing deteriorated propellant.

Solid propellants manufactured using the new compositions of our invention can be conveniently ignited by a conventional igniter, as for example, the igniter disclosed in assignee's copending patent application, Serial No. 306,030, filed August 23, 1952. Our new polyesters can be used to replace all or a part of the polyesters disclosed in assignee's U.S. application Serial No. 33,054, filed May 31, 1960. The propellant is preferably cast in a chamber having one end open and leading into a conventional venturi rocket nozzle. Upon ignition, large quantities of gases are produced and exhausted through the nozzle creating propulsive force.

The polyesters of our invention can be condensed with various diisocyanates or diketenes and then cross-linked with various cross-linking polyols including the following: glycerol monoricinoleate, glycerol triricinoleate, triethanolamine, triisopropanolamine, diamino diphenylsulfone, diethylbis-orthochloroaniline, propoxylated glycerol and divinyl sulfone. Diisocyanates which can be used include the following: toluene diisocyanate, xylyl diisocyanate, ethylene diisocyanate and p,p'-diphenyl diisocyanate. These cross-linking agents can be used in conjunction with one another or separately and can be added at any convenient point or order in the process.

Polyesters which are to be cast in systems containing large amounts of solids should satisfy the following criteria: low viscosity, long pot life, low exotherm heats of curing and low shrinkage during cure. Low viscosity can generally be achieved by using a low molecular weight polyester. However, using a low molecular weight polyester results in high temperatures and high shrinkage during curing, which are both undesirable in many applications, such as in solid propellants. In other applications, such as toys, where large cross-sections are not involved and a high degree of precision is not necessary, it is permissable to have relatively high heats of exotherm and shrinkage. Here, a low molecular weight polyester can be used. Our highly branched polyesters provide low viscosity, high molecular weight materials which can be cured without high shrinkage.

In general, all of our polyesters provide long curing times coupled with a rapid rate of formation and a resistance to hydrolysis. Thus, our polyesters are particularly useful where a long pot life and a stable polyester are desired. In addition to these desirable properties our most preferred polyesters provide a cured product which is very stable to thermal deterioration.

Thermally stable polymers are required where the properties of the polymer must remain substantially constant over long periods of time and under adverse conditions.

Long pot life is necessary in applications where a considerable lapse of time is required between the addition of the curing agent and the time when the mixture becomes too viscous to cast. This allows time for mixing and compounding the polymer with other ingredients, and transporting the mixture from the mixing station to the casting station.

Our preferred polyesters for propellant purposes, are those having a relatively high molecular weight (about 1000 to about 3000); containing an alkylene radical, A, having an odd number of carbon atoms, and terminated with a hydroxy group attached to a secondary carbon atom in alkylene radical $G_2$, as defined above. These features provide long pot life, low viscosity, and low shrinkage and heat of exotherm during curing.

It should be understood that various modifications may be made in this invention without departing from the spirit thereof or the scope of the claims.

We claim:

1. A hydroxy-terminated polyester having the formula:

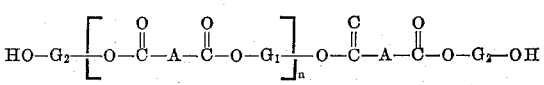

wherein $n$ is an integer ranging from about 2 to about 50, A is a divalent hydrocarbon radical selected from the group consisting of aliphatic and cycloaliphatic alkylene and cycloalkylene radicals containing from 0 to about 34 carbon atoms, $G_1$ and $G_2$ are divalent radicals selected from the group consisting of aliphatic hydrocarbon radicals and oxyaliphatic radicals consisting of carbon, hydrogen and oxygen, and $G_2$ is bonded to the terminal hydroxy group through a bond to a secondary carbon atom.

2. The hydroxy-terminated polyester of claim 1 wherein A is a divalent aliphatic radical containing from 0 to about 10 carbon atoms and at least one of said radicals A, $G_1$, and $G_2$ contains branching side chains.

3. The hydroxy-terminated polyester of claim 2 wherein $G_1$ is an alkylene radical having two alkyl side chains connected to a carbon atom which is adjacent to a terminal carbon atom.

4. The hydroxy-terminated polyester of claim 3 wherein $G_2$ is an alkylene radical having from 3 to about 10 carbon atoms and $G_1$ is an alkylene radical having from 5 to about 10 carbon atoms in a straight chain.

5. The polyester of claim 3 wherein A is an alkylene radical having an odd number of carbon atoms.

6. The polyester of claim 3 wherein A is an alkylene radical having from 5 to 9 carbon atoms.

7. The hydroxy-terminated polyester of claim 6 wherein A contains an odd number of carbon atoms.

8. The polyester of claim 3 wherein $G_1$ is 2,2-dimethyl-1,3-propylene and A is 1,7-heptylene.

9. The method of preparing a hydroxy-terminated polyester having the formula:

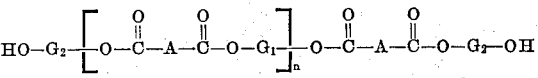

which comprises reacting a polymeric reactant having the formula:

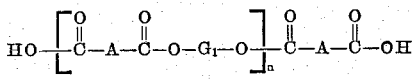

wherein $n$ is an integer ranging from about 2 to about 50; A is a divalent hydrocarbon radical selected from the group consisting of aliphatic and cycloaliphatic alkylene and cycloalkylene radicals containing from 0 to about 34 carbon atoms; and $G_1$ is a divalent radical selected from the group consisting of aliphatic hydrocarbon radicals and oxyaliphatic radicals consisting of carbon, hydrogen and oxygen; and including mixtures of said polymeric reactants with an excess of a diol having the formula:

wherein $G_2$ is a divalent radical selected from the group consisting of aliphatic hydrocarbon radicals and oxyaliphatic radicals consisting of carbon, hydrogen and oxygen having at least one hydroxy radical bonded to a secondary carbon atom, said reaction being conducted at an elevated temperature in the absence of a reactive atmosphere with agitation of the reaction mixture.

10. The method of claim 9 wherein said reaction is carried out in the presence of an inert gas.

11. The method of claim 9 wherein said reaction is carried out under vacuum.

12. The method of claim 9 wherein the reaction is carried out at a temperature from about 150° C. to about 250° C.

13. The method of claim 12 wherein HO—$G_2$—OH is a volatile diol and the reaction mixture is heated rapidly to a temperature from about 150° C. to about 250° C. at which reaction takes place.

14. The method of preparing a hydroxy-terminated polyester having the formula:

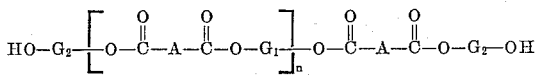

which comprises reacting a polymeric reactant having the formula:

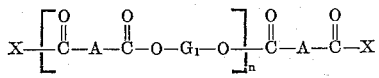

wherein $n$ is an integer ranging from about 2 to about 50, A is a divalent hydrocarbon radical selected from the group consisting of aliphatic and cycloaliphatic alkylene and cycloalkylene radicals containing from 0 to about 34 carbon atoms, $G_1$ is a divalent radical selected from the group consisting of aliphatic hydrocarbon radicals and oxyaliphatic radicals consisting of carbon, hydrogen and oxygen, and X is a halogen radical with a diol having the formula:

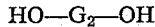

wherein $G_2$ is a divalent radical selected from the group consisting of aliphatic hydrocarbon radicals and oxyaliphatic radicals consisting of carbon, hydrogen and oxygen having at least one hydroxy radical bonded to a secondary carbon atom, said reaction being carried out in a warm basic environment.

15. The method of preparing a hydroxy-terminated polyester having the formula:

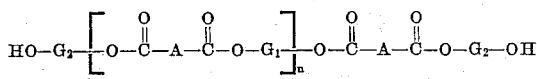

which comprises reacting a polymeric reactant having the formula:

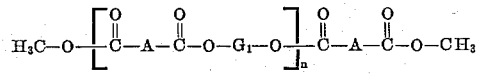

wherein $n$ is an integer ranging from about 2 to about 50, A is a divalent hydrocarbon radical selected from the group consisting of aliphatic and cycloaliphatic alkylene and cycloalkylene radicals containing from 0 to about 34 carbon atoms, and $G_1$ is a divalent radical selected from the group consisting of aliphatic hydrocarbon radicals and oxyaliphatic radicals consisting of carbon, hydrogen and oxygen with a diol having the formula:

wherein $G_2$ is a divalent radical selected from the group consisting of aliphatic hydrocarbon radicals and oxyaliphatic radicals consisting of carbon, hydrogen and oxygen having at least one hydroxy radical bonded to a secondary carbon atom, said reaction being carried out at elevated temperatures.

16. The method of preparing a hydroxy terminated polyester having the formula:

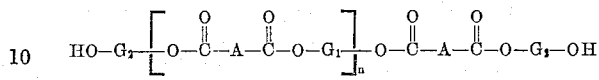

which comprises reacting a polymeric reactant selected from the group consisting of

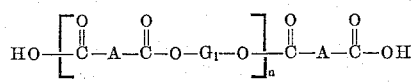

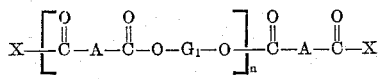

and

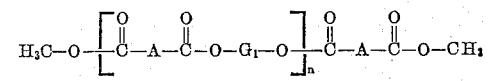

wherein $n$ is an integer ranging from about 2 to about 50, A is a divalent hydrocarbon radical selected from the group consisting of aliphatic and cycloaliphatic alkylene and cycloalkylene radicals containing from 0 to about 34 carbon atoms, $G_1$ is a divalent radical selected from the group consisting of aliphatic hydrocarbon radicals and oxyaliphatic radicals consisting of carbon, hydrogen and oxygen, and X is a halogen radical, with a diol having the formula

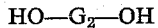

wherein $G_2$ is a divalent radical selected from the group consisting of aliphatic hydrocarbon radicals and oxyaliphatic radicals consisting of carbon, hydrogen and oxygen having at least one hydroxy radical bonded to a secondary carbon atom.

No references cited.

WILLIAM H. SHORT, *Primary Examiner.*

LEON D. ROSDOL, *Examiner.*

J. W. WHISLER, L. A. SEBASTIAN, ROBERT LYON, *Assistant Examiners.*